(No Model.)
F. F. & H. DEITCHLER.
LISTED CORN CULTIVATOR.
No. 420,043. Patented Jan. 28, 1890.
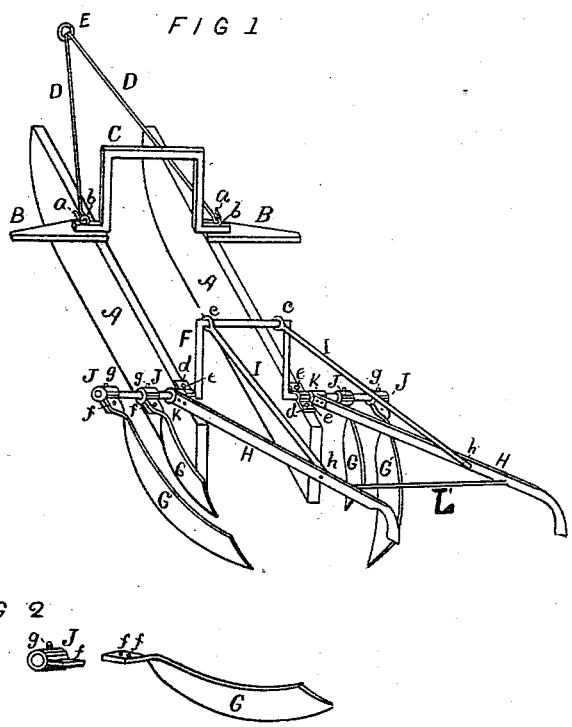
FIG 2
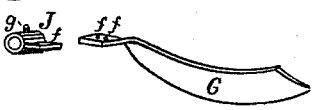
WITNESSES: INVENTORS
ATTORNEY

UNITED STATES PATENT OFFICE.

FREDERICK FRANZ DEITCHLER AND HENRY DEITCHLER, OF MINEOLA, IOWA.

LISTED-CORN CULTIVATOR.

SPECIFICATION forming part of Letters Patent No. 420,043, dated January 28, 1890.

Application filed July 18, 1889. Serial No. 317,942. (No model.)

*To all whom it may concern:*

Be it known that we, FREDERICK FRANZ DEITCHLER and HENRY DEITCHLER, both citizens of the United States, and both residing at Mineola, in the county of Mills, State of Iowa, have invented a new and useful Listed-Corn Cultivator, of which the following is a specification.

Our invention relates to listed-corn cultivators; and the object of our invention is to construct a simple, substantial, and effective machine by affording the readiest means of adjusting the cutting-depth of the knives and providing rest therefor when not in use, and which machine shall be so constructed as to cultivate the soil and destroy the weeds and grass upon the tops and sides of the ridges and between the ridges of listed corn. We obtain these objects by the mechanism illustrated in the accompanying drawings, in which—

Figure 1 is a perspective view of the entire machine ready for use, and Fig. 2 of one of the knives and its holder.

Similar letters refer to similar parts throughout both views.

The letters A A represent two wooden runners, which in operating the cultivator run at the bottom of the ditch on either side of the row of corn. These are partially held in place by the iron arch C, which is attached to the two pieces of wood B B and to the runners A A by the bolts $b\ b$. To the eye of the bolts $b\ b$ is attached the hooks $a\ a$ of the draw-bars D D, to which the team is attached at the ring E. The runners A A are connected also by the iron arch-bar F, which is attached to the runners at the points of intersection by the boxes $d\ d$, fastened to the runners by the bolts $e\ e$.

The letters J J and K represent cast-iron sleeves or boxes, which are attached to the base of arch-bar F by the set-screws $g\ g$. To the sleeves or boxes J J are attached the steel knives G G, having twisted shanks, by means of the bolts $f\ f$. Then to the iron sleeves or boxes K K are attached, by means of the bolts $f\ f$, the handles H H, which are also attached to the iron arch-bar F at the points $c\ c$ by the iron rods I I, which rods are also attached to the handles H H by the bolts $h\ h$.

The letter L represents an iron rod fastening together the handles H H by passing through each and being secured at either end by nuts.

We are aware that prior to our invention listed-corn cultivators have been made having runners, arches, and blades similar to ours, the blades adjustable by sundry devices and attached to wooden runners. We therefore do not claim such combination, broadly, as specified; but What we do claim as our invention, and desire to secure by Letters Patent, is—

In a listed-corn cultivator, the combination, with the runners and the cross-bar B C, of the arched bar F, handles H, braces I, adjustable sleeves or collars J K, and knives G, having twisted shanks, substantially as shown and described.

FREDERICK FRANZ DEITCHLER.
HENRY DEITCHLER.

Witnesses:
FRED DANIELSON,
HENRY HAMMER.